(12) United States Patent
Melen (10) Patent No.: US 6,205,241 B1
(45) Date of Patent: Mar. 20, 2001

(54) COMPRESSION OF STEREOSCOPIC IMAGES

(75) Inventor: Roger D. Melen, Los Altos Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/088,617

(22) Filed: Jun. 1, 1998

(51) Int. Cl.$^7$ .................. G06K 9/00; G06K 9/36
(52) U.S. Cl. .............. 382/154; 348/42; 382/232
(58) Field of Search .................. 382/100, 103, 382/106, 154, 239, 232, 276, 191, 284; 250/558; 356/12; 358/88, 107, 450; 364/561, 514; 348/47, 48, 42

(56) References Cited

U.S. PATENT DOCUMENTS

| | | | |
|---|---|---|---|
| 3,769,889 | 11/1973 | Wechsler | 396/327 |
| 3,883,251 | 5/1975 | Helava | 356/444 |
| 4,601,053 | * 7/1986 | Grumet | 382/1 |
| 5,249,035 | 9/1993 | Yamanaka | 356/376 |
| 5,347,363 | 9/1994 | Yamanaka | 356/376 |
| 5,390,024 | 2/1995 | Wright | 356/376 |
| 5,432,712 | 7/1995 | Chan | 382/191 |
| 5,455,689 | 10/1995 | Taylor et al. | 358/450 |
| 5,475,422 | 12/1995 | Mori et al. | 348/48 |
| 5,495,576 | 2/1996 | Ritchey | 345/425 |
| 5,510,831 | 4/1996 | Mayhew | 348/47 |
| 5,644,651 | 7/1997 | Cox et al. | 382/154 |
| 5,655,033 | 8/1997 | Inoguchi et al. | 382/293 |
| 5,680,474 | 10/1997 | Iijima et al. | 382/154 |
| 5,703,961 | * 12/1997 | Rogina et al. | 382/154 |
| 5,852,672 | * 12/1998 | Lu | 382/154 |
| 5,973,726 | * 10/1999 | Iijima et al. | 348/38 |

FOREIGN PATENT DOCUMENTS 10-32840    2/1998    (JP) .................. H04N/13/00

OTHER PUBLICATIONS

Zhizhuo, W., "From Photogrammetry to Geomatics—a Commemoration of the Accomplishment that is VirtuoZo", The VirtuoZo Manuscript, http://www.squirrel.com.au/virtuozo/Manuscript/wang/html, Dec. 18, 1997, Australia.

Roux, M., "Cartography Updating", http://www-ima.enst.fr/activite_96/en/node42.html, Mar. 24, 1998, France.

Dupéret. A., "Automatic Derivation of a DTM to Produce Countour Lines", http://dgrwww.epfl.ch/PHOT/publicat/wks96/Art_3_2.html, Mar. 24, 1998, France.

* cited by examiner

Primary Examiner—Bhavesh Mehta
Assistant Examiner—Ali Bayat
(74) Attorney, Agent, or Firm—Fenwick & West LLP (57) ABSTRACT

A set of stereoscopic images (300) is compressed. For apparent points (404) in the set of stereoscopic images (300), a region (502) is identified in each image (300) which represents at least the apparent point (404). The locations of these regions (502) within the images (300), together with the geometry of the vantage point (306) locations, specify the apparent depths (416) of the apparent points (404) in the scene. Information relating to the apparent depths (416) is recorded for the apparent points (404). This recorded depth information, together with just one of the stereoscopic images (300), can be used to later reconstruct the other stereoscopic image (300) for stereoscopic viewing. The set of stereoscopic images (300) can be still images or moving images, and they can be captured digitally, scanned from photographs, or computer-generated.

30 Claims, 6 Drawing Sheets

Image 300a

Image 300b

Image 300c     Undefined Region 700

COMPRESSION OF STEREOSCOPIC IMAGES

FIELD OF INVENTION

This invention pertains to the field of image compression. More specifically, this invention pertains to a range based method of compressing a stereoscopic set of images.

BACKGROUND OF THE INVENTION

Stereoscopic photography has been practiced since almost the beginning of photography itself. Early stereoscopic viewers allowed users to view scenic locations with a realism lacking in ordinary photography. Modern versions of stereoscopic viewers, such as the View-Master, produced by Tyco Toys, have long been staples of the toy industry. Advances in technology have produced such variations as "3-D" movies and, more recently, "virtual reality," or computer generated interactive stereoscopic simulations. As real-time stereoscopic viewers are beginning to find uses in such areas as the medical field, it is apparent that stereoscopic viewing is becoming more common.

Figure 1:
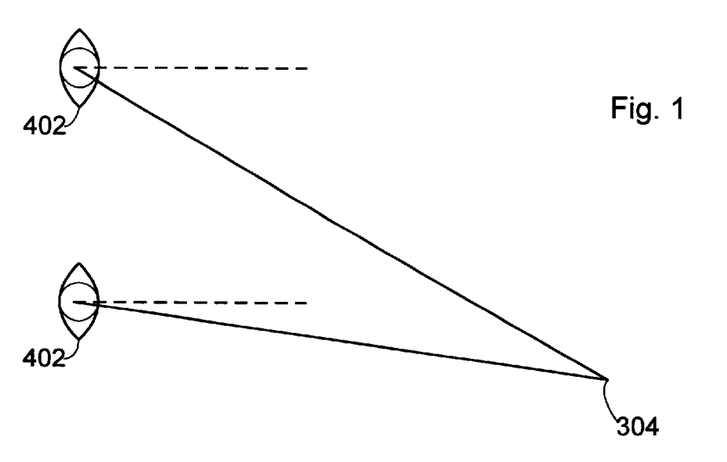
FIG. 1 is an illustration of a pair of eyes 402 viewing a point 304.
Figure 2:
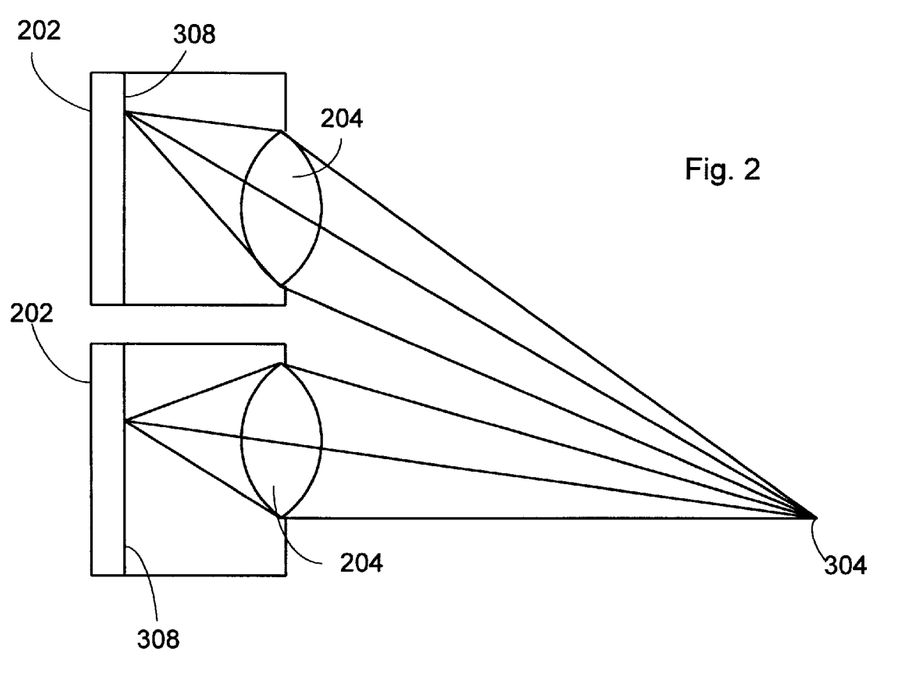
FIG. 2 is an illustration of two cameras producing a stereoscopic set of images of a point 304.
Figure 3A:
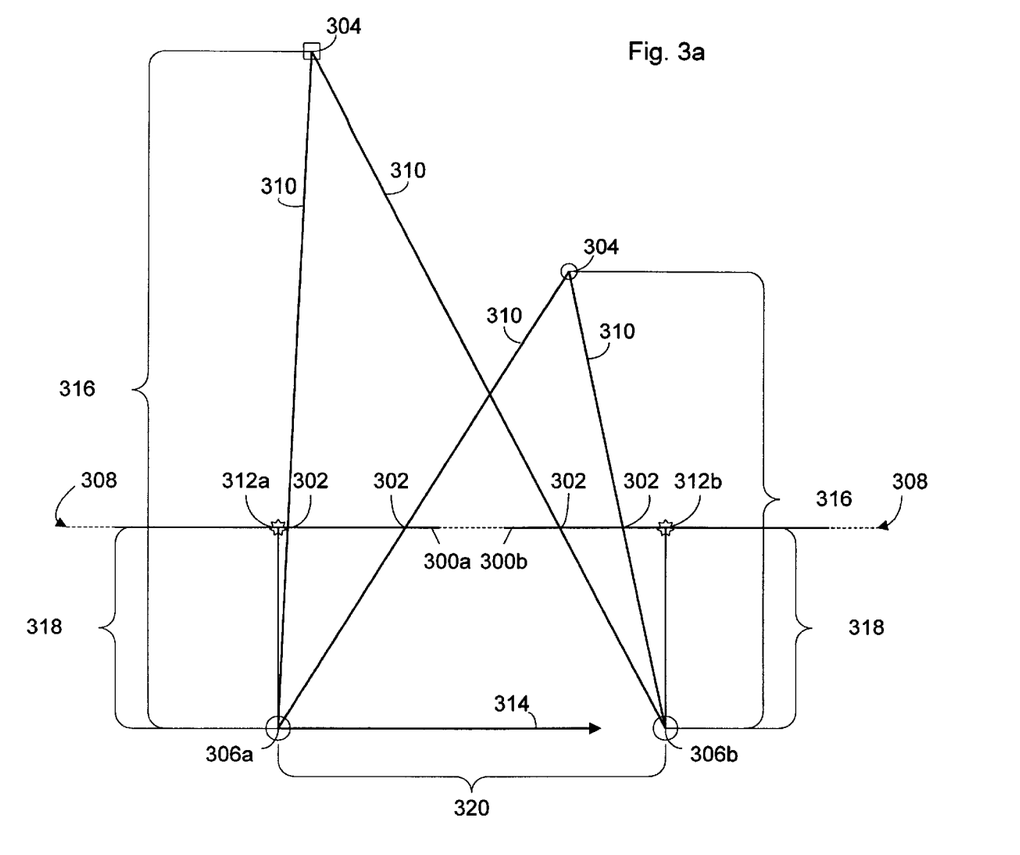
FIG. 3a is a planar view of the geometry involved in creating stereoscopic images 300a and 300b.
Figure 3B:
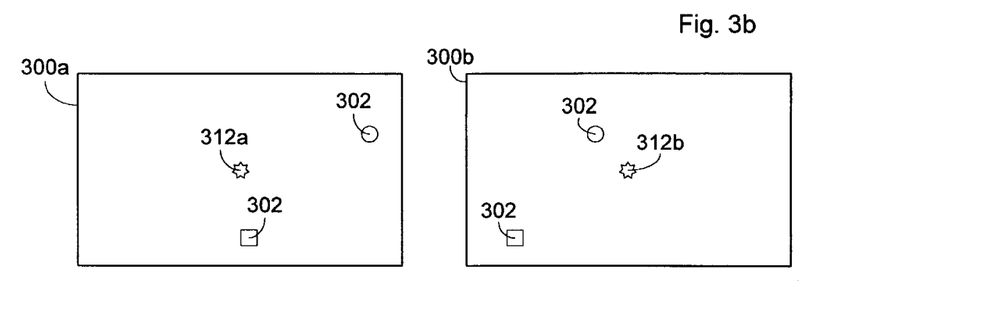

The optical phenomenon exploited by the brain to extract depth information from a three dimensional scene is known as "parallax." As shown in FIG. 1, a person with two functional eyes 402 viewing point 304 sees slightly different images in each eye 402, due to the slightly different angle from each eye 402 to point 304. The apparent location of point 304 is different in each image formed by eyes 402. By analyzing the differences due to parallax, the brain is able to determine the distance to point 304. By photographing, or otherwise recording, a scene from two distinct locations which mimic the location of eyes 402, as illustrated in FIG. 2, a set of images can be generated which, when viewed properly, can recreate the parallax of the original scene, giving the illusion of three dimensions in the two dimensional images. Each camera 202 uses a lens or lens system 204 to project an image of point 304 onto image plane 308. As illustrated in FIGS. 3a and 3b, each image point 302 of images 300a and 300b represents a point 304 in a three dimensional scene. Each image 300 is associated with a "vantage point" 306, which is the location of the point of view of that image 300. Each image point 302 corresponds to the intersection of an image plane 308 with a "view line" 310. A view line 310 passes through a vantage point 306 and the point 304 in the scene which is represented by image point 302. The view line 310 which passes through a vantage point 306 and intersects image plane 308 perpendicularly defines a "center point" 312 in the image 300 associated with the vantage point 306.

A set of two or more images 300 is "stereoscopic" if they represent substantially parallel views of substantially the same scene, with the vantage points 306 of the images 300 being separated in a direction substantially perpendicular to the direction of the views, this perpendicular direction defining the "epipolar" axis 314.

Figure 4:
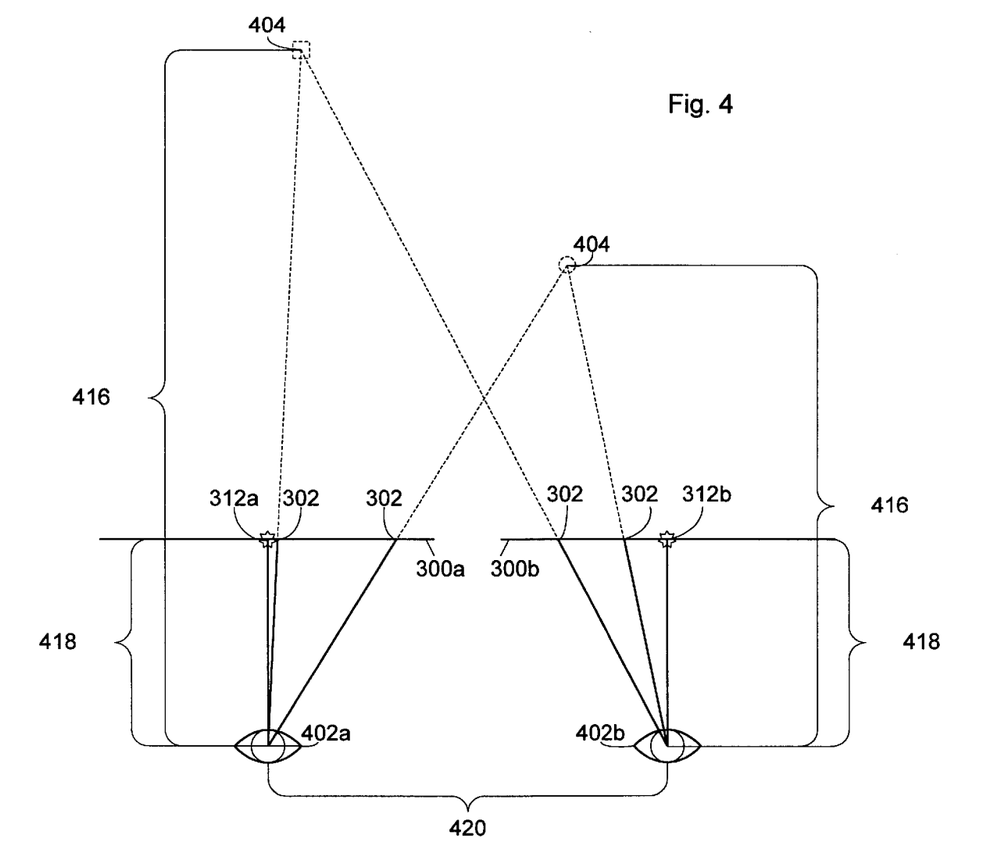
FIG. 4 is a planar view of a pair of eyes 402 viewing a stereoscopic set of images 300a and 300b.

As illustrated in FIG. 4, when stereoscopic images 300 are viewed with eyes 402 taking the place of vantage points 306 relative to images 300, a viewer perceives apparent points 404 where points 304 had been. Apparent points 404 appear to be at a distance 416 which is proportional to the actual distance 316 of points 304, scaled by the ratio of distance 418 to distance 318, and the ratio of distance 420 to distance 320. Distance 420 is the distance between each of the viewer's eyes 402, and distance 320 is the distance between vantage points 306. Distance 418 is the distance between the viewer's eyes 402 and images 300, and distance 318 is the distance between vantage points 306 and image plane 308.

Stereoscopic systems require the use of at least two stereoscopic images 300 to create the illusion of three dimensional apparent points 404. Graphic images typically contain a large amount of information. Because of this, the storage and transmission of graphic images generally benefit from the use of compression techniques which reduce the amount of information necessary to reconstruct an image. A compressed graphics file contains less information than an uncompressed image, but it can be used to recreate, either perfectly or with losses, the uncompressed image. Because multiple graphic images are required by stereoscopic systems, the image storage and transmission requirements of such systems are twice the image storage and transmission requirements of ordinary monocular images. As such, stereoscopic systems are especially prone to benefit from image compression techniques. What is needed is an image compression technique which is especially suited to stereoscopic images, taking advantage of the high level of redundancy in stereoscopic image sets.

SUMMARY OF THE INVENTION

In one embodiment, the present invention comprises a method for compressing a set of stereoscopic images (300). For at least one of the apparent points (404) represented in the set of stereoscopic images (300), a region (502) which represents at least the apparent point (404) is identified in each image (300). The locations of these regions (502) within the images (300), together with the geometry of the vantage point (306) locations relative to image plane (308), specify the apparent depths (416) of the apparent points (404) in the scene. Information relating to the apparent depths (416) is recorded for the apparent points (404). This recorded depth information, together with just one of the stereoscopic images (300), can be used to later reconstruct the other stereoscopic image (300) for stereoscopic viewing.

The set of stereoscopic images (300) can be still images or moving images, and they can be captured digitally, scanned from photographs, or computer-generated.

BRIEF DESCRIPTION OF THE DRAWINGS

FIG. 3b is an illustration of stereoscopic images 300a and 300b resulting from the geometry of FIG. 3a.

DETAILED DESCRIPTION OF THE PREFERRED EMBODIMENTS

Figure 5:
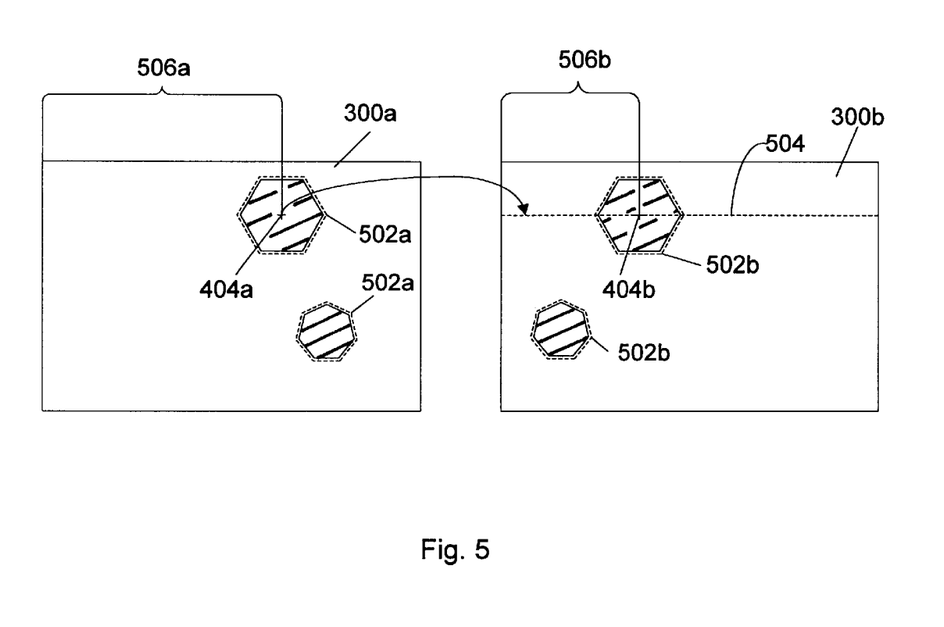
FIG. 5 is an illustration of a stereoscopic set of images 300a and 300b which contain points 404 which are bounded by areas 502.
Figure 6:
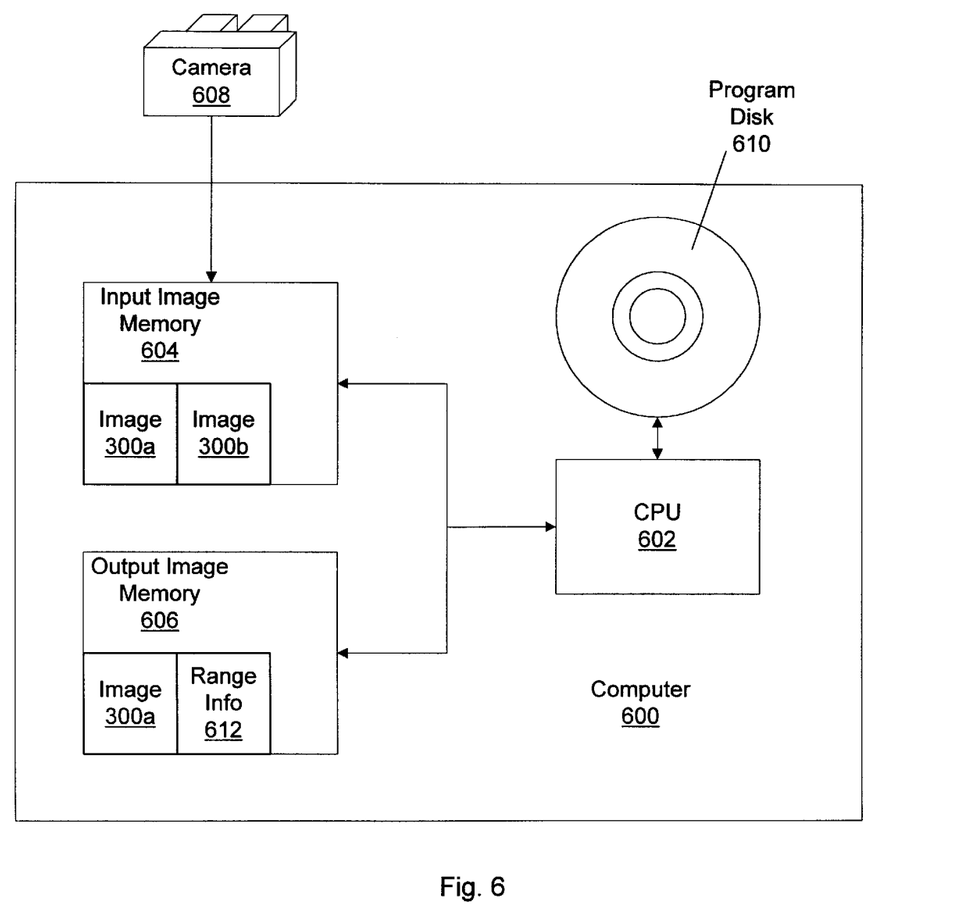
FIG. 6 is an illustration of one embodiment of the invention.

Referring now to FIGS. 5 and 6, an embodiment of the present invention is described. Camera 608 with two imaging systems is used to capture a stereoscopic set of images 300 based on a real world scene. Camera 608 can capture images 300 in digital form, or analog photographs can be scanned at a later time to produce digital images 300. In other embodiments, images 300 are computer generated images based on a computer model of a three dimensional scene. Images 300 can also be moving images representing either a real world scene or a computer model. Images 300 are stored in digital form in input image memory 604, where they are accessible to central processing unit (CPU) 602. CPU 602 responds to program instructions stored on a computer readable medium, such as program disk 610. In the embodiment illustrated in FIG. 6, input image memory 604, CPU 602, and program disk 610 reside in computer 600. In other embodiments, some or all of these elements are incorporated in camera 608.

Responding to the instructions of the program on disk 610, CPU 602 operates on stereoscopic images 300a and 300b, which each represent at least one apparent point 404 in common. Each image 300a and 300b is examined to determine regions 502. Each region 502a in image 300a represents at least one apparent point 404 which is also represented by a corresponding region 502b in image 300b. There are a number of possible approaches to determining corresponding regions 502. Both object-based and non-object-based types of approaches are described, and other approaches can be employed by alternate embodiments of the present invention.

One object-based method for determining corresponding regions 502 is to use standard edge-detection methods to find objects represented in each image 300. The region 502 representing an object in image 300a will likely represent many of the same apparent points 404 as a region 502 representing the same object in image 300b. Edge-detection methods generally analyze small patches of an image to determine contrast. Areas of each image 300 with high contrast are assumed to represent edges of objects. The gradients of contrast in the small patches indicate the direction perpendicular to the object edge. An area of each image 300 which is generally circumscribed by detected edges, and is generally devoid of detected edges on the interior, is assumed to be a region 502 representing an object. In FIG. 5, shaded objects are indicated as being enclosed in regions 502. Less sophisticated object-based methods can be utilized in appropriate circumstances. For example, if each image 300 contains only dark objects against a light background, a luminance threshold can be used to characterize every pixel as either an object pixel or a background pixel. In that case all contiguous object pixels are determined to constitute an area 502 representing a single object.

After regions 502 which represent objects have been identified in each image 300, it is necessary to match detected objects in image 300a to objects in image 300b. This task is simplified by the geometry of the stereoscopic set-up when the views are substantially parallel. For parallel views, an apparent point 404 will appear in both images 300 at the same vertical location, where vertical is the direction within image plane 308 which is perpendicular to the epipolar direction. This vertical location is indicated by epipolar line 504 in FIG. 5. If the views are almost parallel, epipolar line 504 along which apparent point 404b can appear in image 300b, given the location of matching apparent point 404a in image 300a, is nearly horizontal. Given accurate information about the alignment of the system used to create images 300, epipolar line 504 is easily calculated, which greatly simplifies the task of matching regions 502. Without accurate alignment information, regions 502 from a larger set of vertical locations in image 300b must be considered as possible matches for a given region 502a in image 300a.

Several techniques can be employed to match regions 502 which have been identified using one of the object-based methods. In one embodiment, the width, height and mean color of target region 502a in image 300a are compared to the width, height and mean color of each region 502b located near the corresponding epipolar line 504 in image 300b. The region 502b which most nearly resembles the target region 502a is considered the match. More sophisticated methods, such as cross-correlation, can also be employed. For example, each element of a two-dimensional Fourier transform of one region 502a is multiplied by the complex conjugate of each corresponding element of a two-dimensional Fourier transform of another region 502b, resulting in a Fourier transform of a cross-correlation. Applying an inverse two dimensional Fourier transform results in a cross-correlation, the magnitude of which can be used to determine the degree of fit between the two regions 502. Other transforms can also be used in performing cross-correlations, which are useful for determining the best match given a number of possible matches.

After regions 502a in image 300a have been matched up with regions 502b in image 300b, the epipolar offset of each region 502a is determined. The epipolar offset is the difference along the epipolar axis 314 between the location of region 502a in image 300a and the location of matching region 502b in image 300b. To determine the epipolar offset of a region 502 in two or more images 300, it is necessary to have a "characteristic" point in each image 300 from which to measure the location of regions 502 within that image 300. The preferred characteristic point is the upper left corner of each image 300. Another possible characteristic point is center point 312, which represents the intersection with the image plane 308 of that view line 310 which is perpendicular to image plane 308, as illustrated in FIG. 3a. A point 304 located an infinite distance in front of image plane 308 would appear at center point 312 in both images 300. Using the characteristic points, the position 506 of each region 502 in each image 300 can be determined.

Non-object-based methods of determining regions 502 and epipolar offsets can also be used. In one such embodiment of the present invention, small areas of image 300a are compared to small areas of image 300b which are located on epipolar lines 504 which correspond to the small areas of image 300a. Correlation techniques like those described above are used to determine which small area in image 300b corresponds to each small area in image 300a. The small areas are determined by applying a grid to each image 300. The small areas can be, at the limit, as small as one pixel each. In cases where areas as small as one pixel are used, however, the correlation techniques will take into account areas surrounding the pixel. Matching small areas are assumed to represent essentially the same apparent points 404.

Having matched small areas in two images 300, the epipolar offset for each small area is easily determined. In one approach each small area in image 300a is considered an independent region 502a with an independent epipolar offset. In another approach, the collection of all small areas which share a common epipolar offset can be considered to constitute a single region 502a with that epipolar offset. In the second case regions 502a can be abnormally shaped, and might not even be contiguous. In either of these cases, however, each region 502a will have one epipolar offset associated with it.

In image 300a of FIG. 5, the centroid of a region 502a is a distance 506a to the right of the left edge of image 300a. In image 300b, the corresponding region 502b is located a distance 506b to the right of the left edge of image 300b. The difference in locations is distance 506a minus distance 506b, or more generally:

$$Offset_{point} = X_A - X_B \qquad \text{Eq. 1}$$

where $X_A$ is the distance of a region 502a to the right of a characteristic point in image 300a, $X_B$ is the distance of the corresponding region 502b to the right of the characteristic point in image 300b, and $Offset_{point}$ is the epipolar offset of the region 502a in image 300a. Referring to FIG. 3, if distance 320 between the right and left vantage points 306 is $Offset_{vantage}$, and distance 318 between vantage points 306 and image plane 308 is $Depth_{image}$, then the following relation gives $Depth_{point}$, the perpendicular distance 316 from vantage points 306 to a point 304 represented by region 502:

$$Depth_{point} = \frac{Depth_{image} * Offset_{vantage}}{Offset_{point}} \qquad \text{Eq. 2}$$

From Equation 2, the depth 316 of actual point 304 can be determined.

It is apparent from Equation 2 that $Depth_{point}$ and $Offset_{point}$ are inversely related, and that apparent depth 416 for an apparent point 404 can be recorded indirectly by recording $Offset_{point}$, the corresponding epipolar offset, assuming the other parameters of Equation 2 are known. In the illustrative embodiment of the present invention, stereoscopic image pair 300 is compressed by replacing image 300b with a list of locations of regions 502a in image 300a, and the corresponding epipolar offset for each. A region 502a can generally be uniquely identified in the list by the location of an image point 302 within region 502a. The list of locations and offsets generally takes considerably less storage space than image 300b alone, and this list constitutes the compressed form of image 300b in the illustrative embodiment.

When it is desired to use image pair 300 for stereoscopic viewing, image 300b must be reconstructed. This is done by first making a copy of image 300a. Then, regions 502a in image 300a are determined using the same method as in the compression procedure, and the proper epipolar offset for each region 502a is determined from the list. Finally, the regions 502a in duplicate image 300a are moved by the distance specified by the corresponding epipolar offsets. The portions of duplicate image 300a which had previously been occupied by regions 502a are replaced by either a neutral color or a background pattern. Alternately, the background surrounding the original position of region 502 can be extended into the vacant space. After the movement of regions 502a, duplicate image 300a becomes a reconstructed version of image 300b.

Figure 7:
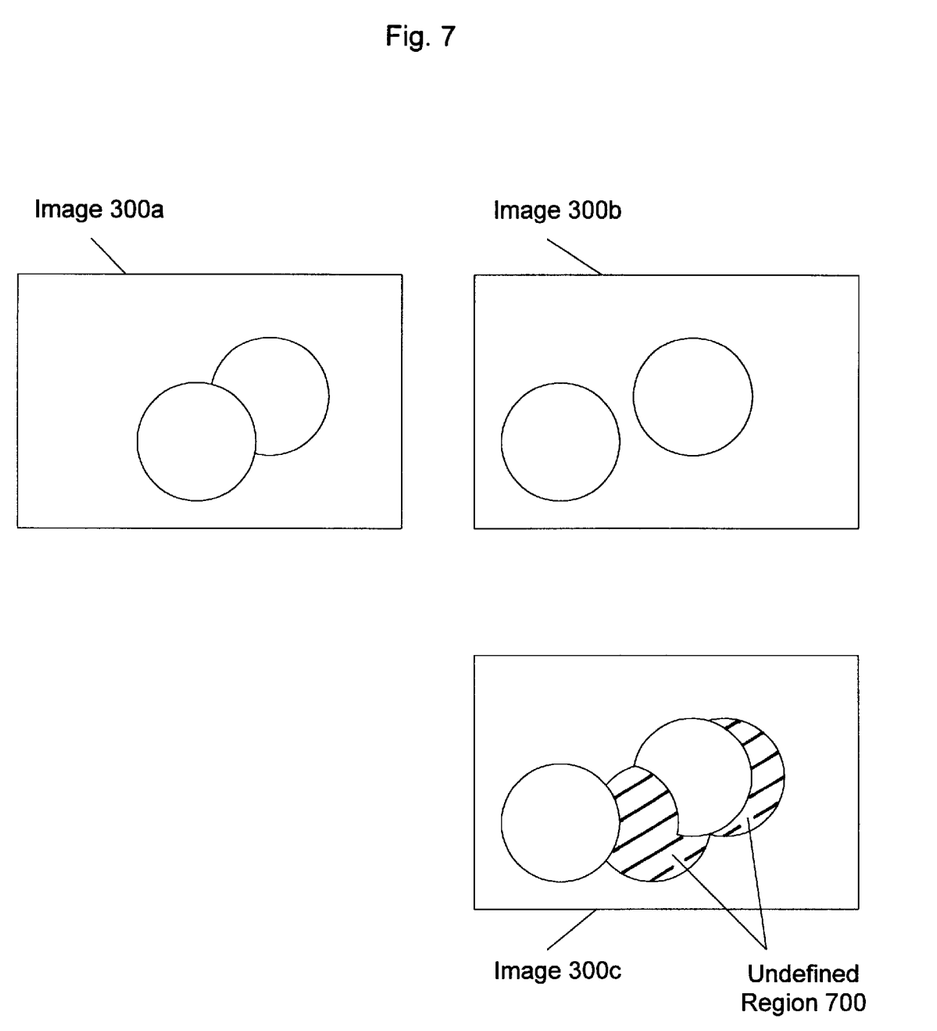
FIG. 7 is an illustration of an undefined region 700 in a reconstructed image 300c which is based on stereoscopic images 300a and 300b.

A more accurate reconstructed image 300b can be achieved by recording, as part of the compressed form of image 300b, those portions of image 300b which are visible in image 300b only. Referring now to FIG. 7, a set of stereoscopic images 300a and 300b are shown. Two circular objects are partially overlapping in image 300a, and are not overlapping in image 300b, where both objects are translated along the epipolar axis. A reconstruction 300c of image 300b relying only on the information present in image 300a leaves an undefined region 700. As discussed above, this undefined region can be filled in through a number of methods which approximate a general background pattern. Alternately, the actual portion of image 300b corresponding to undefined region 700 can be recorded as an image. This recorded region 700 is then used in the reconstruction process to fill in the undefined region 700 of image 300c. Because most stereoscopic image sets contain relatively small undefined regions 700, saving the image information from these regions 700 will generally still allow for significant compression.

The methods described do not generally allow image 300b to be recreated exactly, but for points 404 which are properly identified and matched, the reconstructed stereoscopic image pair 300 will exhibit the same effect of depth as the original image pair 300. In many applications such a reconstructed image 300b works acceptably well.

The above description is included to illustrate the operation of exemplary embodiments and is not meant to limit the scope of the invention. The scope of the invention is to be limited only by the following claims. From the above description, many variations will be apparent to one skilled in the art that would be encompassed by the spirit and scope of the present invention.

What is claimed is:

1. A method for compressing one of a stereoscopic set of images, each of the images in the stereoscopic set of images having a vantage point associated therewith, the method comprising the steps of:
   a) identifying in a first image of the stereoscopic set of images a first region representing an apparent point;
   b) identifying in a second image of the stereoscopic set of images a second region representing the apparent point;
   c) determining an epipolar offset, where the epipolar offset is the difference in an epipolar direction between the location of the second region relative to a characteristic point of the second image and the location of the first region relative to a characteristic point of the first image, which epipolar direction is substantially parallel to a vector from the vantage point of the first image to the vantage point of the second image; and
   d) creating a compressed stereoscopic image by replacing the second region with an indication of the first region and with the corresponding epipolar offset.

2. The method of claim 1, wherein the step of identifying in a first image a first region representing an apparent point comprises the sub-steps of:
   using contrast information in the first image to determine edge portions of the first image, which edge portions represent edges of an object; and
   determining as the first region a portion of the first image which is generally circumscribed by the edge portions.

3. The method of claim 2, wherein the step of identifying in a second image a second region representing the apparent point comprises the sub-steps of:
   using contrast information in the second image to determine edge portions of the second image, which edge portions represent edges of the object; and
   determining as the second region a portion of the second image which is generally circumscribed by the edge portions.

4. The method of claim 1, wherein the step of identifying in a first image a first region representing an apparent point comprises selecting as the first region a portion of the first image, and the step of identifying in a second image a second region representing the apparent point comprises the sub-steps of:

selecting in the second image more than one target region, where each target region is the same size as the first region;

performing a cross-correlation calculation to determine the degree of similarity between the first region and each target region; and selecting as the second region that target region which is most similar to the first region.

5. The method of claim 4, wherein the size of the first region is a predetermined number of pixels.

6. The method of claim 5, wherein the size of the first region is one pixel.

7. The method of claim 1, wherein steps (a) through (d) are repeated for a plurality of first and second regions and wherein the method further comprises the step of creating a compressed stereoscopic image by replacing the second image with a list of locations of the plurality of the first regions and the corresponding epipolar offsets.

8. The method of claim 1, wherein one of the first image and the second image is a scanned photograph of a physical scene.

9. The method of claim 1, wherein one of the first image and the second image is an image of a physical scene which has been captured in digital form.

10. The method of claim 1, wherein one of the first image and the second image is a computer generated image.

11. A method for using a first image from a stereoscopic set of images and a compressed form of a second image from the stereoscopic set to construct the second image in uncompressed form, which compressed form of the second image comprises information specifying an epipolar offset which is the difference in an epipolar direction between the location of a first region of the first image relative to a characteristic point of the first image and the location of a second region of the second image relative to a characteristic point of the second image, which epipolar direction is substantially perpendicular to the direction of view of the first image, the method comprising:

identifying the first region in the first image; and producing a third image as an uncompressed form of the second image by overlaying the first region, displaced by the epipolar offset, on a duplicate of the first image.

12. The method of claim 11, further comprising the step of causing a background region of the duplicate of the first image to be replaced with a background pattern, where the background region is a portion of the duplicate of the first image which does correspond to the location of the undisplaced first region, and does not correspond to the location of the first region displaced by the epipolar offset.

13. The method of claim 12, wherein the background pattern comprises a combination of image qualities drawn from portions of the first image surrounding the first region.

14. The method of claim 12, wherein the background pattern is a solid color.

15. The method of claim 12, wherein the compressed form of the second image further comprises background image information based on the portion of the second image which corresponds to the location of the background region, and the background pattern is based on the background image information.

16. A computer apparatus for compressing one of a stereoscopic set of images, each of the images in the stereoscopic set of images having a vantage point associated therewith, the apparatus comprising:

a central processing unit (CPU);

an image memory, coupled to the CPU, for storing a first image of the stereoscopic set of images and a second image of the stereoscopic set of images; and a program memory coupled to the CPU, for storing an array of instructions, which instructions, when executed by the CPU, cause the CPU to:

(a) identify in the first image a first region representing an apparent point;

(b) identify in the second image a second region representing the apparent point;

(c) determine an epipolar offset, where the epipolar offset is the difference in an epipolar direction between the location of the second region relative to a characteristic point of the second image and the location of the first region relative to a characteristic point of the first image, which epipolar direction is parallel to a vector from the vantage point of the first image to the vantage point of the second image; and (d) create a compressed stereoscopic image by replacing the second region with an indication of the first region and with the corresponding epipolar offset.

17. The apparatus of claim 16, wherein the steps (a) through (d) are repeated for a plurality of first and second regions and wherein the method further comprises the step of creating a compressed stereoscopic image by replacing the second image with a list of locations of the plurality of the first regions and the corresponding epipolar offsets.

18. A computer readable medium containing a computer program for compressing one of a stereoscopic set of images, each of the images in the stereoscopic set of images having a vantage point associated therewith, the computer program performing the steps of:

(a) identifying in a first image of the stereoscopic set of images a first region representing an apparent point;

(b) identifying in a second image of the stereoscopic set of images a second region representing the apparent point;

(c) determining an epipolar offset, where the epipolar offset is the difference in an epipolar direction between the location of the second region relative to a characteristic point of the second image and the location of the first region relative to a characteristic point of the first image, which epipolar direction is substantially parallel to a vector from the vantage point of the first image to the vantage point of the second image; and (d) creating a compressed stereoscopic image by replacing the second region with an indication of the first region and with the corresponding epipolar offset.

19. The computer readable medium of claim 18, wherein the steps (a) through (d) are repeated for a plurality of first and second regions and wherein the method further comprises the step of creating a compressed stereoscopic image by replacing the second image with a list of locations of the plurality of the first regions and the corresponding epipolar offsets.

20. A computer readable medium containing a computer program for using a first image from a stereoscopic set of images and a compressed form of a second image from the stereoscopic set to construct the second image in uncompressed form, which compressed form of the second image comprises information specifying an epipolar offset which is the difference in an epipolar direction between the location of a first region of the first image relative to a characteristic point of the first image and the location of a second region of the second image relative to a characteristic point of the second image, which epipolar direction is substantially perpendicular to the direction of view of the first image, the computer program performing the steps of:

identifying the first region in the first image; and producing a third image as an uncompressed form of the second image by overlaying the first region, displaced by the epipolar offset, on a duplicate of the first image.

21. A method for compressing one of a stereoscopic set of images, the method comprising the steps of:

a) identifying in a first image of the stereoscopic set of images a first region representing an apparent point;

b) identifying in a second image of the stereoscopic set of images a second region representing the apparent point;

c) determining a predetermined offset, where the predetermined offset is the difference between the location of the second region relative to a characteristic point of the second image and the location of the first region relative to a characteristic point of the first image; and d) compressing the stereoscopic image by generating the second region according to an indication of the first region and the predetermined offset.

22. The method of claim 21, wherein the step of identifying in a first image a first region representing an apparent point comprises the sub-steps of:

using contrast information in the first image to determine edge portions of the first image, which edge portions represent edges of an object; and determining as the first region a portion of the first image which is generally circumscribed by the edge portions.

23. The method of claim 22, wherein the step of identifying in a second image a second region representing the apparent point comprises the sub-steps of:

using contrast information in the second image to determine edge portions of the second image, which edge portions represent edges of the object; and determining as the second region a portion of the second image which is generally circumscribed by the edge portions.

24. The method of claim 21, wherein the step of identifying in a first image a first region representing an apparent point comprises selecting as the first region a portion of the first image, and the step of identifying in a second image a second region representing the apparent point comprises the sub-steps of:

selecting in the second image more than one target region, where each target region is the same size as the first region;

performing a cross-correlation calculation to determine the degree of similarity between the first region and each target region; and selecting as the second region that target region which is most similar to the first region.

25. The method of claim 24, wherein the size of the first region is a predetermined number of pixels.

26. The method of claim 25, wherein the size of the first region is one pixel.

27. The method of claim 21, wherein steps (a) through (d) are repeated for a plurality of first and second regions and wherein the method further comprises the step of creating a compressed stereoscopic image by replacing the second image with a list of locations of the plurality of the first regions and the predetermined offsets.

28. The method of claim 21, wherein one of the first image and the second image is a scanned photograph of a physical scene.

29. The method of claim 21, wherein one of the first image and the second image is an image of a physical scene which has been captured in digital form.

30. The method of claim 21, wherein one of the first image and the second image is a computer generated image.

* * * * *